United States Patent
Shankar et al.

(10) Patent No.: US 11,620,136 B2
(45) Date of Patent: Apr. 4, 2023

(54) SPACE SNAPSHOTS

(71) Applicant: Microsoft Technology Licensing, LLC, Redmond, WA (US)

(72) Inventors: Vinod R. Shankar, Redmond, WA (US); Taylor Alan Hope, Redmond, WA (US); Karan Mehra, Sammamish, WA (US); Emanuel Paleologu, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 683 days.

(21) Appl. No.: 16/411,018

(22) Filed: May 13, 2019

(65) Prior Publication Data

US 2020/0364058 A1 Nov. 19, 2020

(51) Int. Cl.
*G06F 9/4401* (2018.01)
*G06F 8/65* (2018.01)
*G06F 9/50* (2006.01)

(52) U.S. Cl.
CPC .............. *G06F 9/4411* (2013.01); *G06F 8/65* (2013.01); *G06F 9/5077* (2013.01)

(58) Field of Classification Search
CPC .... G06F 9/411; G06F 8/65; G06F 21/57–577; G06F 9/5077
See application file for complete search history.

(56) References Cited

U.S. PATENT DOCUMENTS

| | | | |
|---|---|---|---|
| 2004/0172577 A1* | 9/2004 | Tan ...................... | G06F 11/1446 714/13 |
| 2009/0216811 A1* | 8/2009 | Manczak .............. | G06F 16/188 |
| 2010/0185827 A1* | 7/2010 | Lowery ................. | G06F 3/0608 711/E12.002 |
| 2012/0233448 A1* | 9/2012 | Malkhasyan ............. | G06F 8/65 713/2 |
| 2015/0089172 A1* | 3/2015 | Kulkarni ................. | G06F 3/065 711/162 |

(Continued)

OTHER PUBLICATIONS

"International Search Report and Written Opinion Issued in PCT Application No. PCT/US2020/026981", dated Jul. 13, 2020, 17 Pages.

*Primary Examiner* — Kim Huynh
*Assistant Examiner* — Cory A. Latham
(74) *Attorney, Agent, or Firm* — Newport IP, LLC; Han K. Gim

(57) ABSTRACT

Data is identified that defines a known good state for a current operating system. The identified data includes read-only sets that are not updated during operation of the computing device, and modifiable sets that can be updated during operation of the computing device. The read-only sets are captured on an opportunistic basis and the modifiable sets are captured when the computing device is to be rebooted. A first and second virtual disk are allocated as snapshots of the identified data. The first virtual disk is updated to generate an updated state. The updates to the first virtual disk are isolated from the second virtual disk. The second virtual disk is maintained as an immutable snapshot of the identified data. In response to a failed reboot with the updated state, the computing device reverts to the known good state using the snapshot of the identified data.

19 Claims, 16 Drawing Sheets

(56) References Cited

U.S. PATENT DOCUMENTS

2016/0162278 A1* 6/2016 Kondik .................... G06F 8/65
  717/168
2018/0349133 A1* 12/2018 Wolf ..................... G06F 16/162

* cited by examiner

SPACE SNAPSHOTS

BACKGROUND

In computing systems, operating systems, applications, and other software are frequently updated to provide improved features, fix bugs, and improve the security of a computing device by protecting against new malware threats. Software updates may be installed by running update programs from media such as a CD-ROM. Updates can also be downloaded via the Internet. Many applications include an automatic update feature that checks for updated versions and downloads/installs the updates, typically with user permissions.

Operating systems may also have an update feature that will download and install new versions and patches to the operating system. In a typical update, various files and data may be downloaded, and the process may involve additional files and data being downloaded as the update process continues. Once the update is completed and the updates are installed, the updated software may be loaded for execution, and the files and data that were used for the update may be deleted.

It is with respect to these and other considerations that the disclosure made herein is presented.

SUMMARY

Systems and methods are described that enable a computing device to maintain and update applications and data, such an operating system, while improving the operation and efficiency of the mechanisms for doing so. A known good state for an operating system may refer generally to an operating system state that is configured to boot the computing device and support normal operational scenarios in a predictable and repeatable manner. The computing device can maintain data that defines and/or is usable to reenter the known good operating system state when the device is rebooted.

When an operating system is updated, various portions of the operating system are typically updated. The system may be rebooted and the updated operating system may be loaded. When the reboot with the updated operating system fails, it is important to return the system to a known clean state, such as the known good state for the operating system. However, it may be difficult to return to such a state, as some artifacts of the updates may remain in the reverted operating system. In many cases, it may not be possible to remove all updates that were added to the operating system, thereby making it impossible to completely to achieve a clean separation between the previous and new operating system.

One solution is to retain and store a full copy of the existing operating system and load a full and separate version of the new operating system. However, maintaining two full versions of an operating system may take a significant amount of storage space. The space usage may be exacerbated when rollbacks are desired, requiring multiple versions of the operating system to be retained. It is desirable therefore to be able to achieve a clean separation between current and new versions of the operating system while minimizing the required storage space, and at the same time allowing for a clean recovery in the event of a failed boot or if other issues occur during the updated, such as a power loss during the boot.

In various embodiments, techniques for creating and maintaining separate and clean versions of operating system updates are disclosed. In an embodiment, updates to various operating system sets or groupings may be stored. For example, the sets may include a main operating system space, which may include the OS binaries, as well as data, applications, user data, and driver sets.

In an embodiment, a snapshot may be taken of the sets. As used herein, a snapshot may be a set of data that defines an application and its states at the point in time that the snapshot is taken. The snapshot may be saved indefinitely to allow for reversion to the snapshot at a future point in time. A copy of the snapshot may be used for updates, therefore allowing both the original version and the updated version to be maintained. In one embodiment, the snapshots may be taken when system setup is started for those sets that are read-only, since these sets will not be changed during the course of operation of the computing system. The operating system update may then begin. Changes to the other sets may be tracked. In sets that are changed during operation of the computing device, such as the data space, the snapshot may be taken at the last possible point before rebooting the computing system. The snapshots for different sets may be taken at different times, based on requirements for each set. The snapshots may be taken opportunistically, based on a predetermined schedule, or based on system conditions and other triggers.

In an embodiment, only the differences between the updated operating system and the current operating system may be tracked in order to reduce required storage space as well as to limit the scope of changes so that the operating system can be reverted in the event of a failure of the updated operating system. In some embodiments, the differences may be tracked using virtual disks or virtual storage volumes. In one embodiment, the sets that make up the current operating system version may be saved as one or more virtual disks. A virtual disk is a virtual representation of the underlying data that is stored on a physical storage device. As such, other than metadata that define the virtual disk and its mappings, a separate physical copy of the current operating system version need not be separately created. Updates to the operating system can be tracked in the newly created virtual disks, and the updates may be tracked as deltas to the version that was stored in the original version. As used herein, a snapshot of an operating system or a portion thereof may be implemented as a virtual disk.

Once the snapshots are taken of an operating system and the changes are tracked, the computing system may be rebooted with the updated operating system. If an updated operating system version is successfully used for boot, then the current operation system version that has been snapshotted can be discarded, or can be saved in the event that reversion is desired at a future point in time. After some specified period of time, or after one or more events such as the operating system version being considered obsolete, then that version may be discarded.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
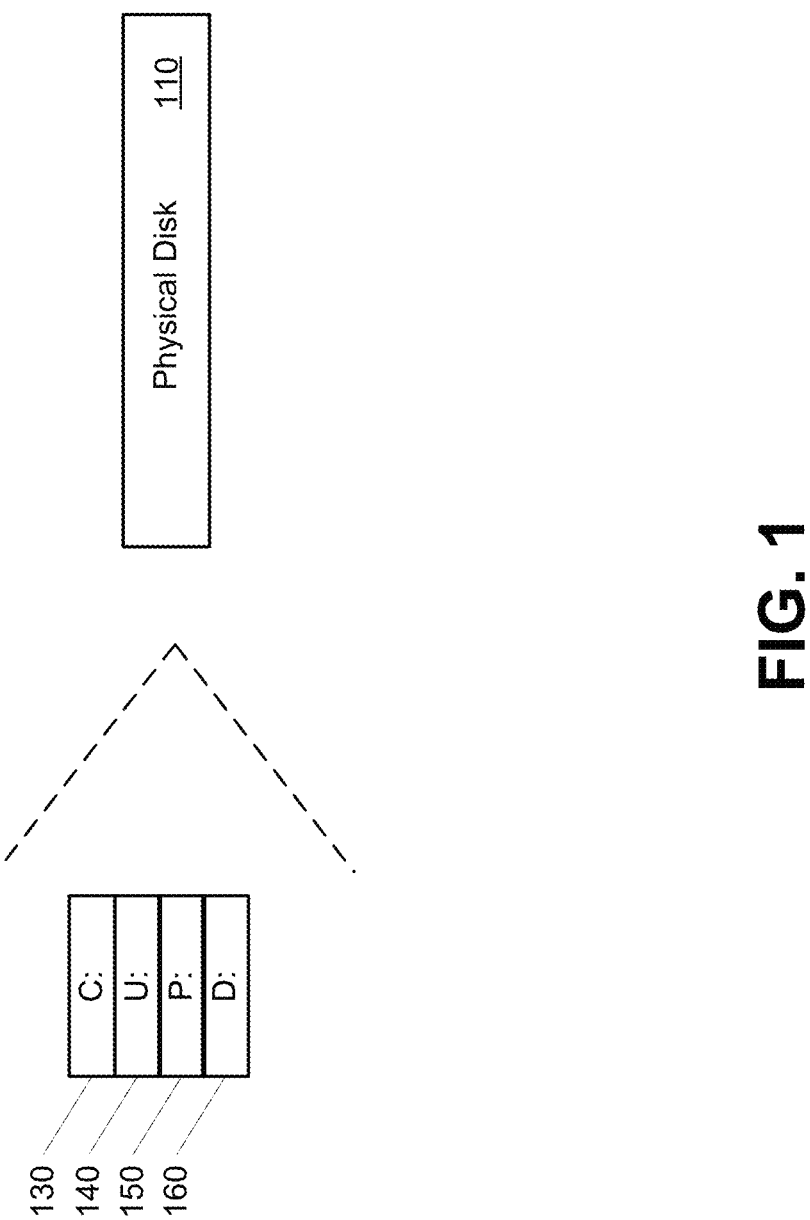
FIG. 1 is an example diagram illustrating operating system sets in accordance with the present disclosure.

When systems and applications are updated such as an operating system, when the update fails, it is important to return the operating system to a known clean state. However, it may be difficult to return to such a state, as some portion of the updates may remain in the reverted operating system. In many cases, it may not be possible to remove all updates that were added to the operating system, thereby making it difficult or impossible to completely achieve a clean separation between the previous and new operating system.

One solution is to retain and store a full copy of the existing operating system and load a full and separate version of the new operating system. However, maintaining two full versions of an operating system may take a significant amount of storage space. The space usage may be exacerbated when rollbacks are desired, requiring multiple versions of the operating system to be retained. It is desirable therefore to be able to achieve a clean separation between current and new versions of the operating system while minimizing the required storage space, and at the same time allowing for a clean recovery in the event of a failed boot or if other issues occur during the updated, such as a power loss during the boot.

In various embodiments, techniques for creating and maintaining separate and clean versions of applications, such as operating system updates, is disclosed. In an embodiment, updates to various operating system sets or groupings may be stored. For example, the sets or groupings may include a main operating system space, which may include the OS binaries, as well as data, applications, user data, and driver sets.

In an embodiment, a snapshot may be taken of all the sets. As used herein, a snapshot may be a set of data that defines an application and its states at the point in time that the snapshot is taken. The snapshot may be saved indefinitely to allow for reversion to the snapshot at a future point in time. A copy of the snapshot may be used for updates, therefore allowing both the original version and the updated version to be maintained.

In one embodiment, the snapshots may be taken when system setup is started for those sets that are read-only, since these sets will not be changed during the course of operation of the computing system. The operating system update may then be initiated. Changes to the other sets may be tracked. In sets that are changed during operation of the computing device, such as the data space, the snapshot may be taken at the last possible point before rebooting the computing system. In an embodiment, only the differences between the updated operating system and the current operating system may be tracked in order to reduce required storage space as well as to limit the scope of changes so that the operating system can be reverted in the event of a failure of the updated operating system.

In various embodiments, a snapshot of an application or a portion thereof may be implemented using virtual disks or virtual storage volumes. In some embodiments, the differences between current and new versions of an application such as an operating system may be tracked using virtual disks or virtual storage volumes. In one embodiment, the sets that make up the current operating system version may be saved as one or more virtual disks. A virtual disk is a virtual representation of the underlying data that is stored on a physical storage device. As such, other than metadata that define the virtual disk and its mappings, a separate physical copy of the current operating system version need not be separately created.

Updates to the operating system can be tracked in the newly created virtual disks, which are tracked as differences or deltas to the version that was stored in the original version. For example, if the original version is a clean-install operating system virtual disk and a new virtual disk is created and designated as the virtual disk for the system to use for updates, then the operating system on the parent virtual disk may kept in its original state as an immutable snapshot for recovery purposes or for creating additional virtual disks.

In an embodiment, metadata may be stored that describes the sets for each operating system version. Each set may be tagged with an operating system version. For example, main OS may be a Main OS1 for set 1, and Main OS2 for set 2. Only one set may be active at any given time, thus preventing multiple operating system versions to appear to be valid.

If an updated operating system version is successfully used for boot, then the current operation system version that has been snapshotted can be discarded, or can be saved in the event that reversion is desired at a future point in time. After some specified period of time, or after one or more events such as the operating system version being considered obsolete, then that version may be discarded.

Among many other benefits, the techniques described herein improve efficiencies with respect to configuring computing devices to repeatedly attempt to install operating system updates or even to lose the ability to boot the computing device into a known operational state. Furthermore, the techniques described enable a clean operating system state to be persisted, and in some embodiments, for multiple states to be snapshotted and persisted. Thus, the described techniques improve computing efficiencies and/or human interaction with computers at least due to mitigating the burden of failed operating system updates. The described techniques also allow for a clean operating system state to be maintained while improving the efficient utilization of storage and processing to efficiently enable updates in a controlled and predictable manner.

While the embodiments disclosed herein are described in the context of operating systems and operating system updates, the described techniques can be implemented to track and manage updates of various kinds such as applications, web pages, files, documents, checkpoints, and the like. More generally, the described techniques may be used in scenarios where it is advantageous to:

1. Enable updates while preserving pristine original states
2. Avoid or minimize significant duplicative space consumption
3. Incur minor overhead for tracking and mapping Various embodiments disclosed herein enable a computing device to predictably and efficiently manage updates to a known good operating system state. The known good state may refer generally to an operating system state that is configured to successfully boot the computing device and support normal operational scenarios. The computing device can maintain data that defines and/or is usable to reenter the known good operating system state when the device is rebooted. The computing device may further track updates to the known good state in a way that maintains a clean separation between updates such that earlier versions are not compromised and rollbacks are easily achieved.

In some embodiments, virtual disks may be used to allow underlying data to be shared among multiple update processes while maintaining separation between the processes without cross-contaminating one another. Maintaining separation between the processes may be implemented using multiple virtual disk mappings. Virtual disks may be implemented as virtual representations of underlying storage volumes. Any set of stored data may be represented as a virtual disk. By defining a set of data as a virtual disk, the defined virtual disk may be updated and treated as a separate update that is distinguished from the original set of data. At the same time, the original data may be defined as its own virtual disk that represents a snapshot of the data prior to applying the updates. Some virtual disks may be treated as immutable. An immutable virtual disk may be considered a snapshot of a set of data at a point in time that is preserved in its state for future retrieval. A mutable virtual disk may be considered a working or updatable version of the set of data that may be used to apply updates and other changes.

Previous implementations involved the system files being located on one volume (e.g., C:), where updates were made within the same volume. If the updates were unsuccessful, unwinding the updates was difficult as each change to the contents of the volume had to be identified and removed. It was also difficult or infeasible to create a new D: volume on the fly, which required allocating and configuring a new storage volume on the existing physical device.

Figure 2:
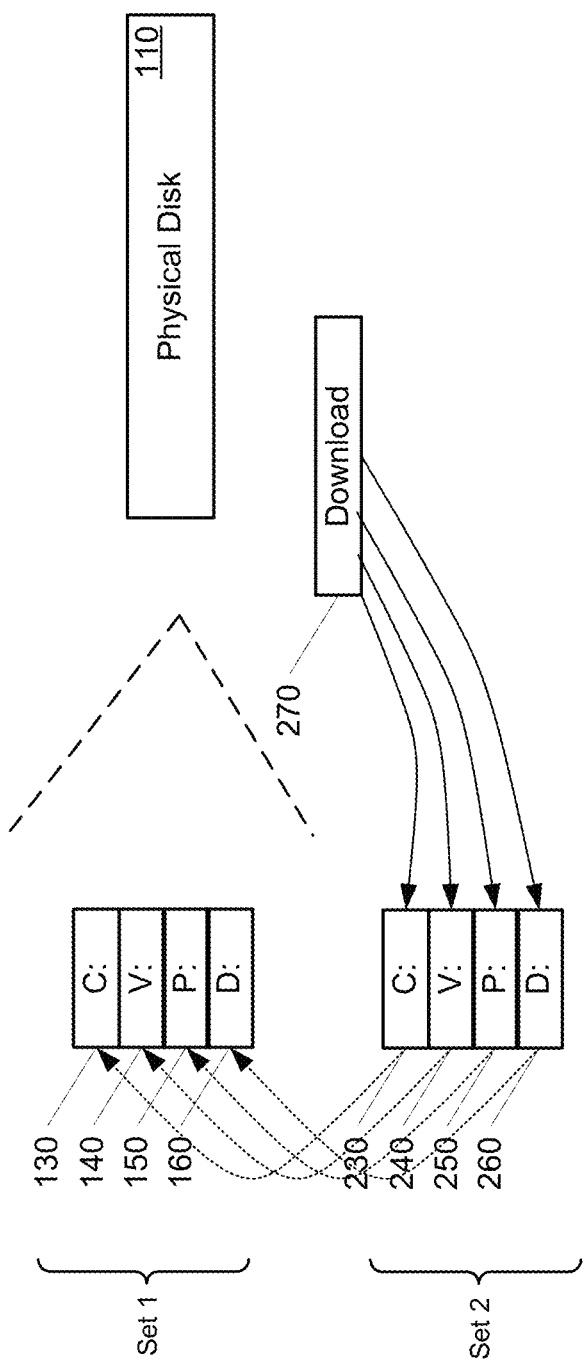
FIG. 2 is an example diagram illustrating operating system sets in accordance with the present disclosure.

Another implementation was creating and saving a separate copy of the operating system, downloading and saving the operating system update, and applying the operating system update to various the parts of the operating system. For example, with reference to FIG. 1, an operating system may be separated into a number of sets that provided separation into separate states. In the example shown in FIG. 1, an operating system is separated into virtual disks represented by C 130, U 140, P 150, and D 160 that share the same physical disk 110. In one embodiment, the sets may be OS binaries, data, applications, user data, and driver sets. To effect a clean copy, one solution is to create a copy of the sets, as illustrated in FIG. 2. A new set of volumes 230, 240, 250, and 260 may be created and the contents may be copied from the volumes 130, 140, 150, and 160. A download storage location 270 may be allocated for receiving the download, which may be used to update the copies of the volumes. The result is a clean copy of the original sets and a separate copy that may be used for installing the updates to the sets. However, a significant amount of space is used by this method.

In various embodiments, each of the sets of an operating system may be represented as their own virtual disk and may be encapsulated from the same underlying physical device. The result is a clean set of virtual disks that represent the original sets and a separate set of virtual disks that may be used for installing the updates to the sets. The updates may then be applied to the virtual disks that represent the new version. In one embodiment, a snapshot set of the original operating system sets may be created as a clean copy of the current operating system, and another set may be created to track and manage the updates. Creating a virtual disk incurs minimal total storage cost, aside from creating and storing metadata that records and maintains the mapping between the virtual disk and the underlying data on the physical device. When the virtual disk is created based on a desired snapshot, the virtual disk is mapped to the stored data that it represents, but no new copies are created. New data is only created and stored when the contents of the virtual disk are modified in some way, after which the virtual disk starts diverging from the original virtual disk.

Figure 3:
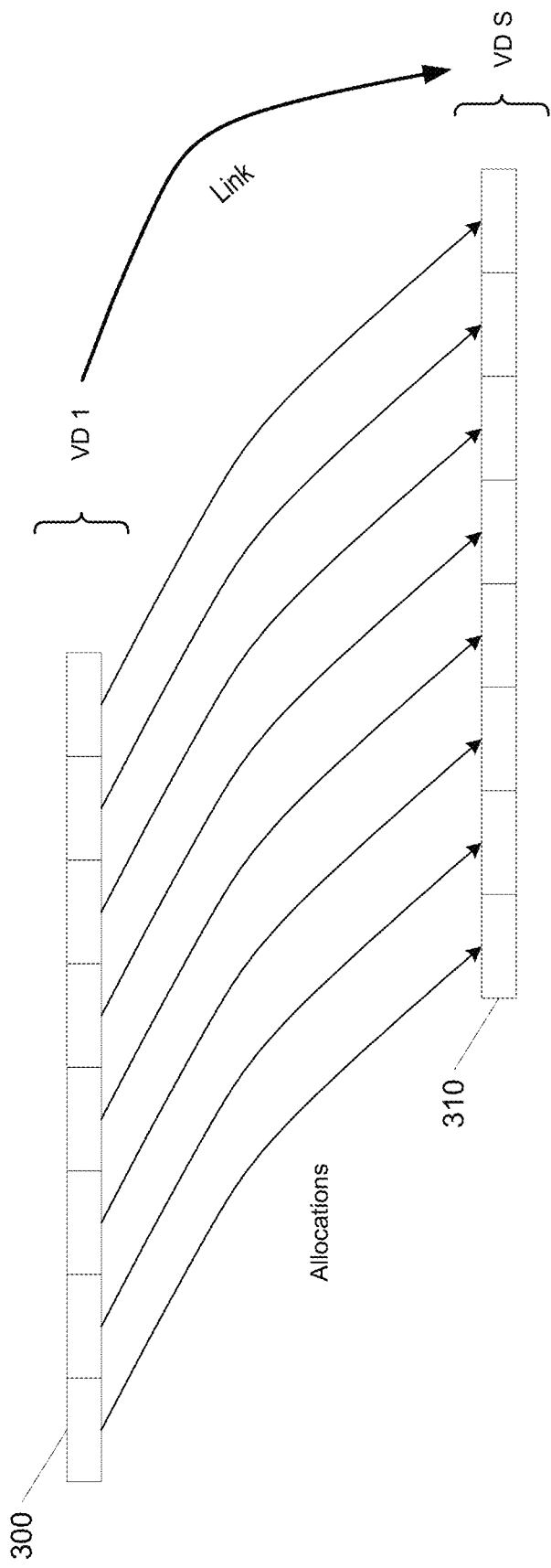
FIG. 3 is an example diagram illustrating virtual disks in accordance with the present disclosure.

Referring to FIG. 3, a virtual disk VD1 300 may include metadata that points to the underlying device for its allocations. In one example, VD1 300 may be created based on VDS 310. VDS 310 then takes all of the metadata allocations of VD1 300, and VD1 300 is linked to VDS 310. VD1 300 is thus a copy of VDS 310 via the mapping of VDS 310. If a read is requested for an area in VD1 300, then it may be determined if VD1 300 has a mapping. If VD1 300 does not have the mapping, then it may be attempted to obtain the mapping from VDS 310. If a write operation is made to VD1 300, VD1 300 at that point can create its own mapping to record the write (e.g., to a new file G). The portion of VD1 300 that is modified may be obtained via VDS 310 and modified. The modified portion may then be stored on the underlying physical device, and the mapping on VD1 300 may be updated to point to the modified portion on the physical device rather than the mapping to VDS 310. VDS 310 still maintains its mapping to the original physical location and thus VD1 300 has diverged from VDS 310. For unchanged portions, VD1 300 may continue to map to VDS 310.

Figure 4:
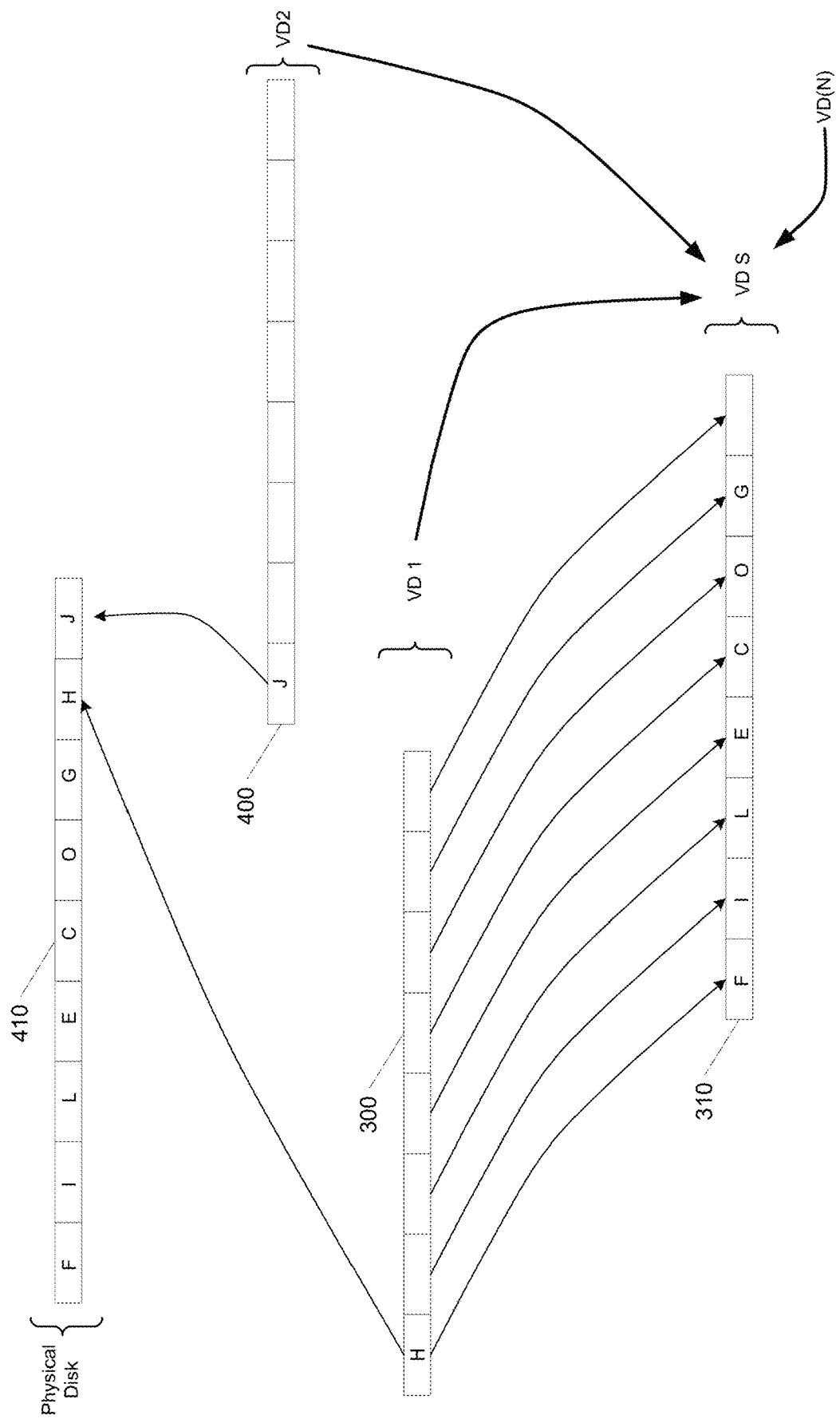
FIG. 4 is a diagram illustrating snapshots in accordance with the present disclosure.

In a further example illustrated in FIG. 4, another virtual disk VD2 400 may be created from VDS 310. VD2 400, like VD1 300, may depend on VDS 310. By continuing in this manner, any number N virtual disks may be created that can be based on VDS 310. Each copy (virtual disk) can diverge from VDS 310, and modified areas can be mapped to the underlying physical disk 410. Areas that are not modified may copy the mapping from VDS 310. For each virtual disk that is generated from a common source such as VDS 310, unchanged areas may reference the same physical location. For example, VD1 300 may have a block updated that originally pointed to block F in VDS 310. The modified block is represented as block H and written to the physical disk 410. In a similar manner, VD1 300 may have a block updated that originally pointed to block F in VDS 310. The modified block is represented as block J and written to the physical disk. Additional virtual disks VD(N) may be created that can be based on VDS 310.

Figure 5A:
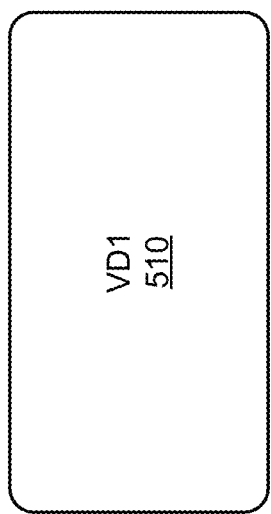
FIG. 5A is a diagram illustrating snapshots in accordance with the present disclosure.
Figure 5B:
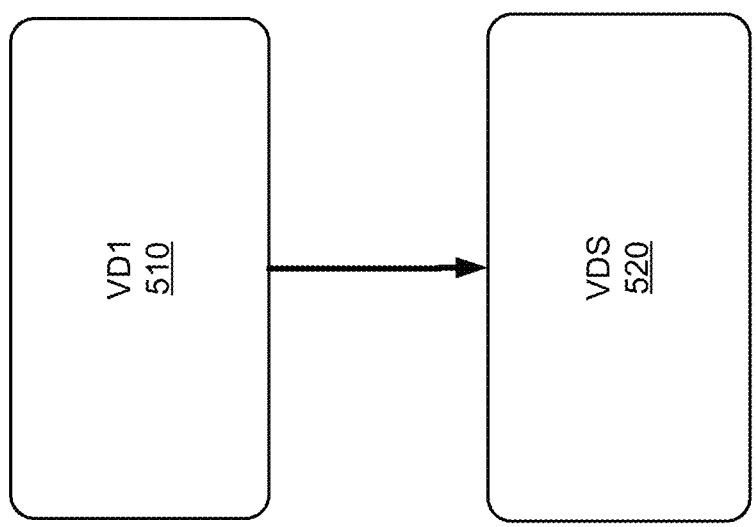
FIG. 5B is a diagram illustrating snapshots in accordance with the present disclosure.
Figure 5C:
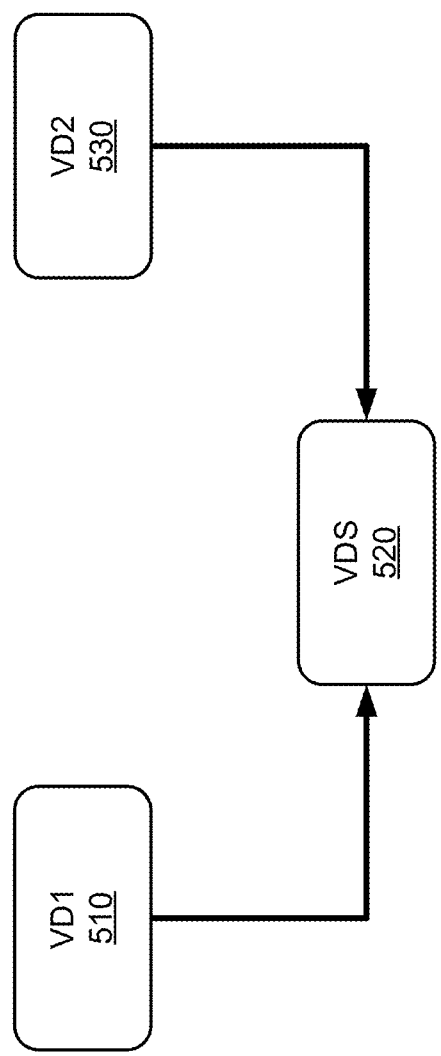
FIG. 5C is a diagram illustrating snapshots in accordance with the present disclosure.
Figure 5D:
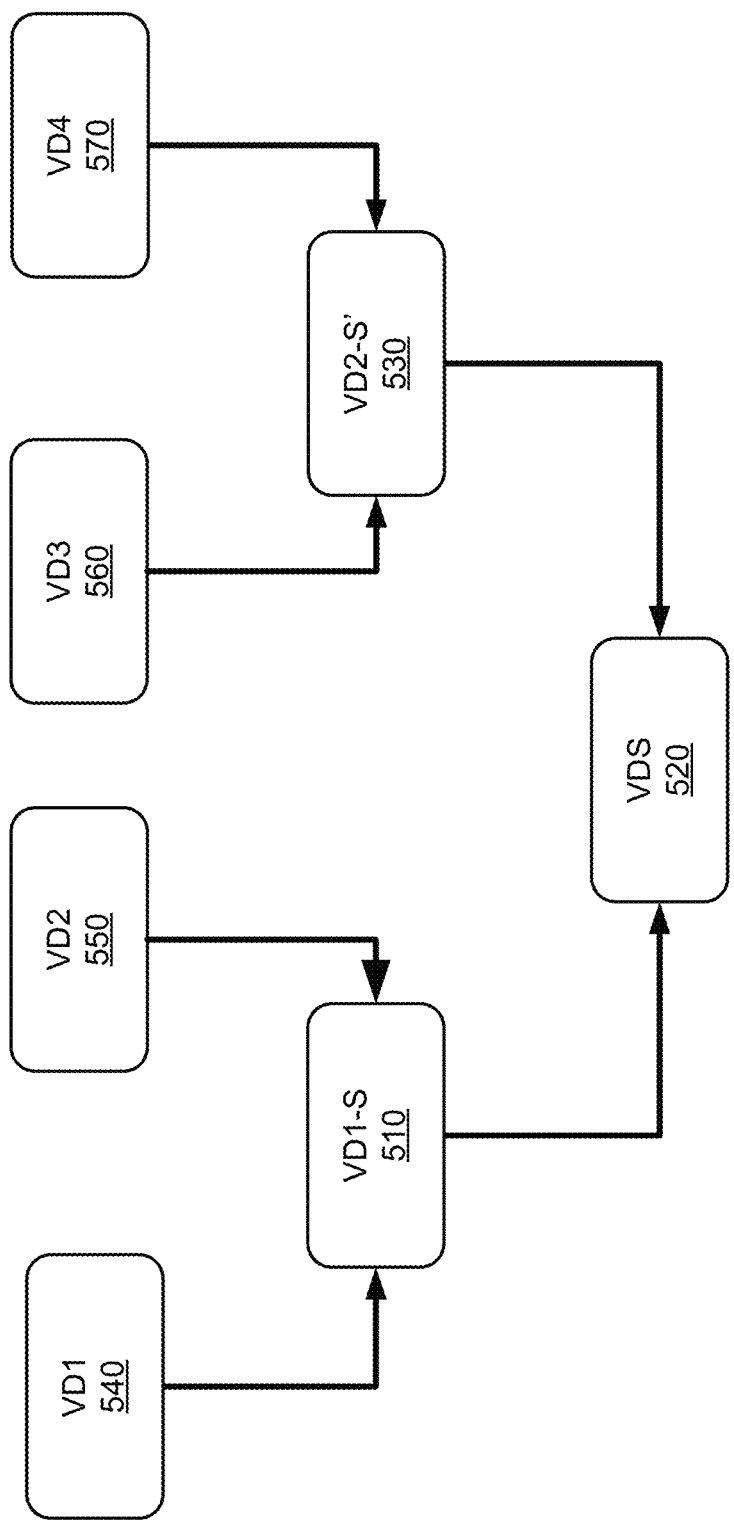
FIG. 5D is a diagram illustrating snapshots in accordance with the present disclosure.

The relationships between snapshots that are captured using the described method may be represented by a tree illustrated in FIG. 5D. New snapshots may be represented by leaves that depend on a parent or root node. The dependency means that a leaf empties its contents to the node that it depends on. Once a leaf is formed, only the leaf can be changed and the root node becomes immutable. In other words, when a leaf is snapshotted, that leaf in turn becomes immutable and only the snap (new) leaf is mutable. A root node and its leaf may be collapsed or merged, if there were no other nodes that depend on the root node.

In the described examples, the point of a snapshot is where the virtual disks may start differing. Snapshots may be taken at different times as needed, using this approach. In one embodiment, the relationships between snapshots may be represented as a tree as described with reference to FIG. 5D. Each node represents a snapshot (virtual disk), and each node can be the basis for further snapshots. A given node may only be modified when that virtual disk is modified, and otherwise cannot be modified by any other node. A node is thus a snapshot that can be made read-only if the snapshot is to be preserved as a permanent clean copy, or can be modified with the snapshot as the starting point.

Referring to FIG. 5A, a virtual disk 510 may be generated and indicated as VD1 510. FIG. 5B illustrates that VD1 510 points to VDS 520. The mappings of VD1 510 may be pointed to the mappings of VDS 520. VDS 520 is thus a snapshot at the point of time that the snapshot is taken and may be treated as immutable. FIG. 5C illustrates creation of an additional virtual disk 530 represented as VD2 that also points to VDS 520. FIG. 5D illustrates that each virtual disk may further be forked to create additional virtual disk nodes. In this way, any nodes can become roots that are snapshots and thus may be treated as immutable. Leaf nodes may be mutable until they themselves become a snapshot and become immutable root nodes.

In some embodiments, multiple snapshots N may be taken to preserve one version or state, and updates may only be made to N−1 (or fewer) of the snapshots. In some embodiments, nodes may be removed. This may be referred to as collapsing. For example, if a rollback is desired, changes made to a virtual disk may be removed, returning the virtual disk to its original state.

In some embodiments, snapshots can be taken automatically as determined by the file system or other function. In some embodiments, the snapshots may be in response to user input or may require user presence.

In some embodiments, optimizations may be added to increase the efficiency of the I/O operations performed for a given virtual disk. For example, when a write is desired for a virtual disk which ultimately is to be written to the underlying physical disk, a read/modify/write may be performed. The portion of the physical disk that is affected by the write may be read, and the changed portion may written.

In another embodiment, on-demand allocation may be used. The affected portion of storage may be allocated and then the new content may written. Any other writes that are needed for that portion can then be written to the allocated portion. For example, if the portion size is 1 Mb, and the new part is 4 Kb, then the 1 Mb may be copied, and then the new 4 Kb may be written. In some embodiments, a number of blocks of storage may be reserved for snapshots and associated updating tasks. Generally, the unit of allocation may be larger than unit of writing, and the described optimizations be allow for only the affected unit of writing to be written while copying or pointing to the unchanged portion of the unit of allocation.

In another embodiment, a journal may be used to record changes that are committed to the disk opportunistically. In this way, I/O operations are not immediately committed to disk in response to every operation. For example, a journal may be implemented as its own virtual disk and may be used record all the writes to the virtual disk that are occurring dynamically and not yet committed and/or fixed in the metadata. For example, the journal may record that 4K out of a 1 Mb unit of allocation at location X is updated. The journal may track which parts are changed on the current (local) virtual disk that are still on the original virtual disk. The recorded writes may then be written to disk in chunks when a threshold amount of writes is reached. Portions of the disk that have multiple writes may thus be copied once to perform the multiple writes.

In a further embodiment, the journal may be implemented as a bitmap to record where the new writes have occurred. The bitmap thus maps which volumes and portions thereof hold writes that need to be committed. The journal may be persisted on a virtual disk and released if no longer needed.

Figure 6:
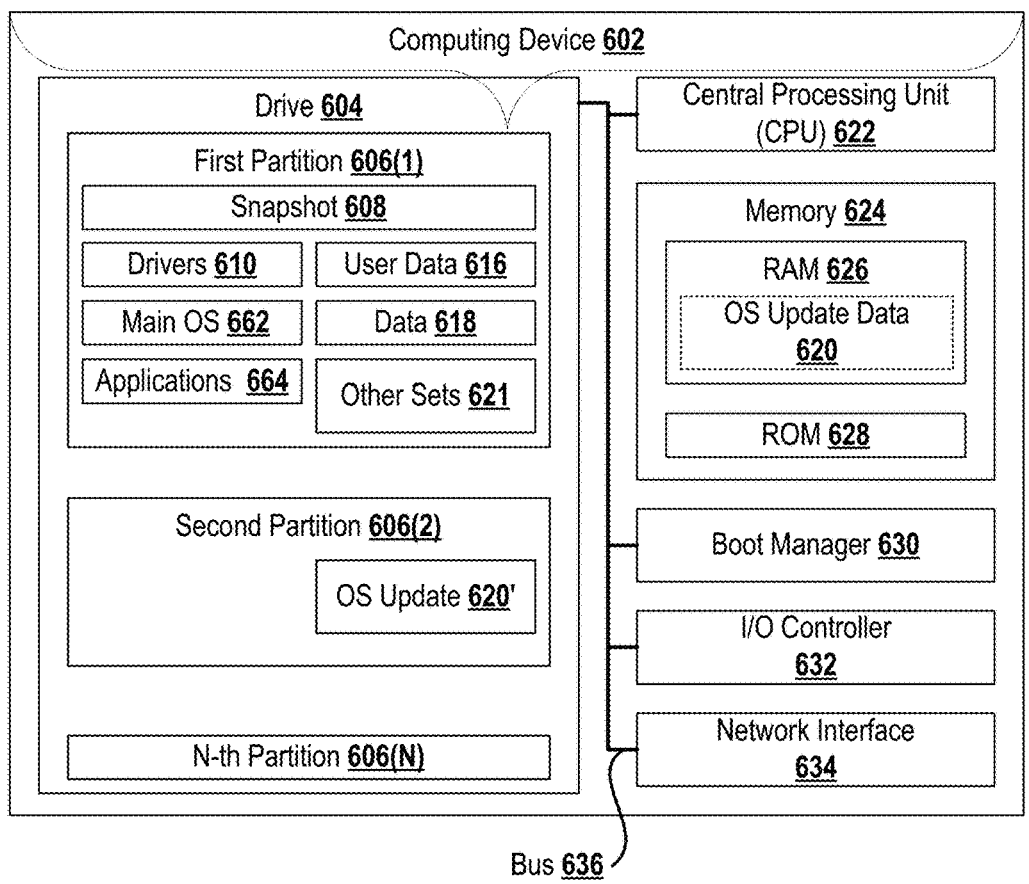
FIG. 6 is a diagram illustrating system diagram in accordance with the present disclosure.

Turning to FIG. 6, illustrated is an example computing system 600 for maintaining operating system state data 620 to maintain an ability to repeatedly attempt operating system boots and/or revert to a known state. The computing device 602 provides an ability to modify and persist the operating system state by updating the operating system state data 620.

Example system components include, but are not limited to, drivers 610, an operating system (OS) 629, an application 664, a registry 616, and/or libraries 618. The example computing system 600 enables the computing device 602 to execute any aspects of the software components and/or functionality presented herein. Furthermore, the example computing architecture 600 illustrated in FIG. 6 shows an example architecture for a personal computer (e.g., a laptop and/or desktop computer), a tablet computer, a smart phone, a server computer, a server rack, a network of server computers, or any other types of computing devices suitable for implementing the functionality described herein.

As illustrated in FIG. 6, the computing device 602 may include one or more drive(s) 604 (hereinafter referred to as the "drive") having computer-readable media that provides nonvolatile storage for the computing device 602. Example drives include, but are not limited to, SATA-type solid-state hard drives, SATA-type hard disks, PATA-type solid-state hard drives, PATA-type hard disks, and/or any other drive-type suitable for providing non-volatile computer-readable media to a computing device. The drive 604 may include multiple partitions 606 for logically separating one or more system components and/or data objects.

In the illustrated example, the drive 604 is separated into a first partition 606(1), a second partition 606(2), and an N-th partition 606(N). In some embodiments, at least one of the partitions 606 stores drivers 610, main operating system (OS) 629, application set 664, user data set 616, and data set 618. Boot manager 630 may be configured to initiate the drivers 610 and to load the OS 629 and other sets into a memory 624. In the illustrated example, the memory 624 includes a random-access memory ("RAM") 626 and a read-only memory ("ROM") 628. As further illustrated, the computing device 602 includes a central processing unit ("CPU") 622 that is connected, via a bus 636, to the drive 604, the memory 624, and the boot manager 630. In some embodiments, the bus 636 further connects an input/output (I/O) controller 632 and/or a network interface 634.

It can be appreciated that the system components described herein (e.g., the drivers 610, the OS 629, and/or the application set 664) may, when loaded into the CPU 622 and executed, transform the CPU 622 and the overall computing device 602 from a general-purpose computing system into a special-purpose computing system customized to facilitate the functionality presented herein. The CPU 622 may be constructed from any number of transistors or other discrete circuit elements, which may individually or collectively assume any number of states. More specifically, the CPU 622 may operate as a finite-state machine, in response to executable instructions contained within the software modules disclosed herein. These computer-executable instructions may transform the CPU 622 by specifying how the CPU 622 transitions between states, thereby transforming the transistors or other discrete hardware elements constituting the CPU 622.

The drive 604 and associated computer-readable media provide non-volatile storage for the computing device 602. Although the description of computer-readable media contained herein refers to a mass storage device, such as a solid-state drive and/or a hard disk, it should be appreciated by those skilled in the art that computer-readable media can be any available non-transitory computer storage media or communication media that can be accessed by a computing architecture such as, for example, the computing architecture 600. Communication media includes computer-readable instructions, data structures, and/or program modules. By way of example, and not limitation, communication media includes wired media such as a wired network or direct-wired connection. Combinations of the any of the above are also included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing device 602. For purposes of the claims, the phrase "computer storage medium," "computer-readable storage medium," and variations thereof, does not include waves, signals, and/or other transitory and/or intangible communication media, per se.

The boot manager 630 may access the main OS 629 from the drive 604 (or a partition thereof) and may load the main OS 629 into the memory 624 for runtime execution by the computing device 602 (e.g., by invoking an OS boot loader). During execution of an OS booting protocol, the boot manager 630 (and/or an OS boot loader thereof) may identify the presence of (and/or verify a validity of) the operation system update data 620. The boot manager 630 may load the operation system update data 620 into the memory 624 to access data for an updated operating system state.

The I/O controller 632 may receive and process input from a number of other devices, including a keyboard, mouse, or electronic stylus (not shown in FIG. 6). Similarly, the I/O controller 632 may provide output to a display screen, a printer, or other type of output device (also not shown in FIG. 6). The network interface 634 may enable the computing device 602 to connect to one or more network(s) 644 such as a local area network (LAN), a wide area network (WAN), a wireless local area network (WLAN), or any other suitable network for passing information between the computing device 602 and a remote resource 642.

As described above, the drive 604 may include multiple partitions 606 for logically separating one or more system components and/or data objects. In the illustrated example, the drive 604 includes the first partition 606(1) which stores instances of the drivers 610, the main OS 629, the application set 664, the user data set 616, the data set 618, and the operating system update data 620. The drivers 610 may include one or more programs for controlling one or more devices that are communicatively coupled to the computing device 602 such as, for example, printers, displays, cameras, soundcards, network cards, computer storage devices, etc. The main OS 629 may be any suitable system software for managing computer hardware and/or software resources and for providing services to the application set 664 and/or other applications (not shown). An example main OS 629 may include, but is not limited to, various versions of MICROSOFT WINDOWS (e.g., WINDOWS 8.1 or 60, WINDOWS EMBEDDED STANDARD 7, etc.), Mac OS X, iOS, etc.

The application set 664 may be a computer program that is configured to be run by the main OS 629 to perform one or more coordinated functions, tasks, and/or activities. Example applications 664 include, but are not limited to, applications configured to support one or more specific operations and/or general applications (e.g., a word processor and/or spreadsheet application, a web browser application, etc.).

The main OS 629 may include a database containing information usable to boot and/or configure the main OS 629, system-wide software settings that control the operation of the OS 629, security databases, and/or user specific configuration settings. The main OS 629 may further contain information associated with in-memory volatile data such as, for example, a current hardware state of the main OS 629 (e.g., which drivers are currently loaded and in use by the OS 629).

The main OS 629 may include libraries which may be a collection of non-volatile resources that are usable (e.g., callable) by the application set 664 and/or other applications (not shown). Example resources include, but are not limited to, pre-written code and/or subroutines, configuration data, and/or classes (e.g., extensible program-code-templates for creating objects of various types). In various implementations, the libraries may enable the application 664 to call upon various system services provided by the main OS 629. For example, the libraries may include one or more subsystem Dynamic Link Libraries (DLLs) configured for implementing and/or exposing Application Programming Interface (API) functionalities of the main OS 629 to the application set 664.

The operation system update data 620 may define an operating system state of the computing device 602 and/or system components thereof. From a known good state of the operating system, the operation system update data 620 may be loaded into the memory 624 to attempt a boot of the updated operating system.

It can be appreciated, therefore, that the operation system update data 620 may correspond to a snapshot 608 of the current operating system of the computing device 602 and may include data about the drivers 610, the main OS 629, and other sets that are operational at the time the current operating system state is snapshotted (recorded).

For example, upon receipt of an instruction to save data defining the current operating system state, the computing device 602 (and/or a power manager thereof) may access and compress contents of the memory 624 that pertain to the current operating system and save the compressed contents of the memory 624 to snapshot data 608.

The operation system update data 620 is stored on the drive 604, which provides non-volatile storage for the computing device 602. The computing device 602 may be fully powered down (or even abruptly lose power) without losing access to the operation system update data 620. When the computing device 602 is later turned on it may automatically transition to the current operating system state because the boot manager 630 may identify that the current operating system state has a count of infinity and no other operating system version has a count great than zero. However, if the updated operating system 620' stored in the second partition 606(2) has a count greater than zero, then the operation system update data 620' has priority for the current boot, and the boot manager 630 may execute a specific booting protocol to cause the computing device 602 to load and execute the updated operating system 620'.

Figure 7:
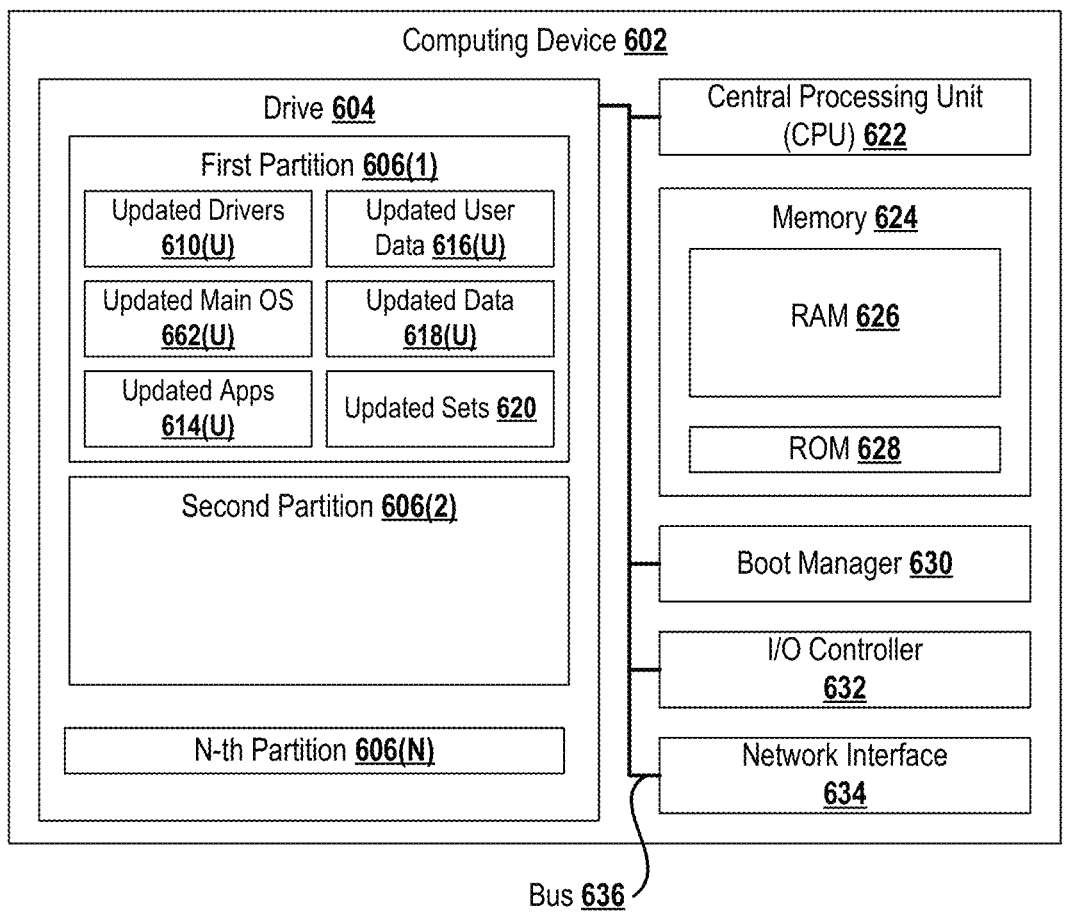
FIG. 7 is a diagram illustrating system diagram in accordance with the present disclosure.

Turning to FIG. 7, the example computing device 602 is illustrated following the incorporation of an updated operating system resulting in at least some of the system components being updated based on the successful boot of the updated operating system. In the illustrated example, aspects of several system components have been updated and, therefore, the first partition 606(1) is shown to include updated drivers 610(U), an updated main OS 612(U), updated application set 614(U), updated user data set 616(U), and updated data set 618(U).

Figure 8:
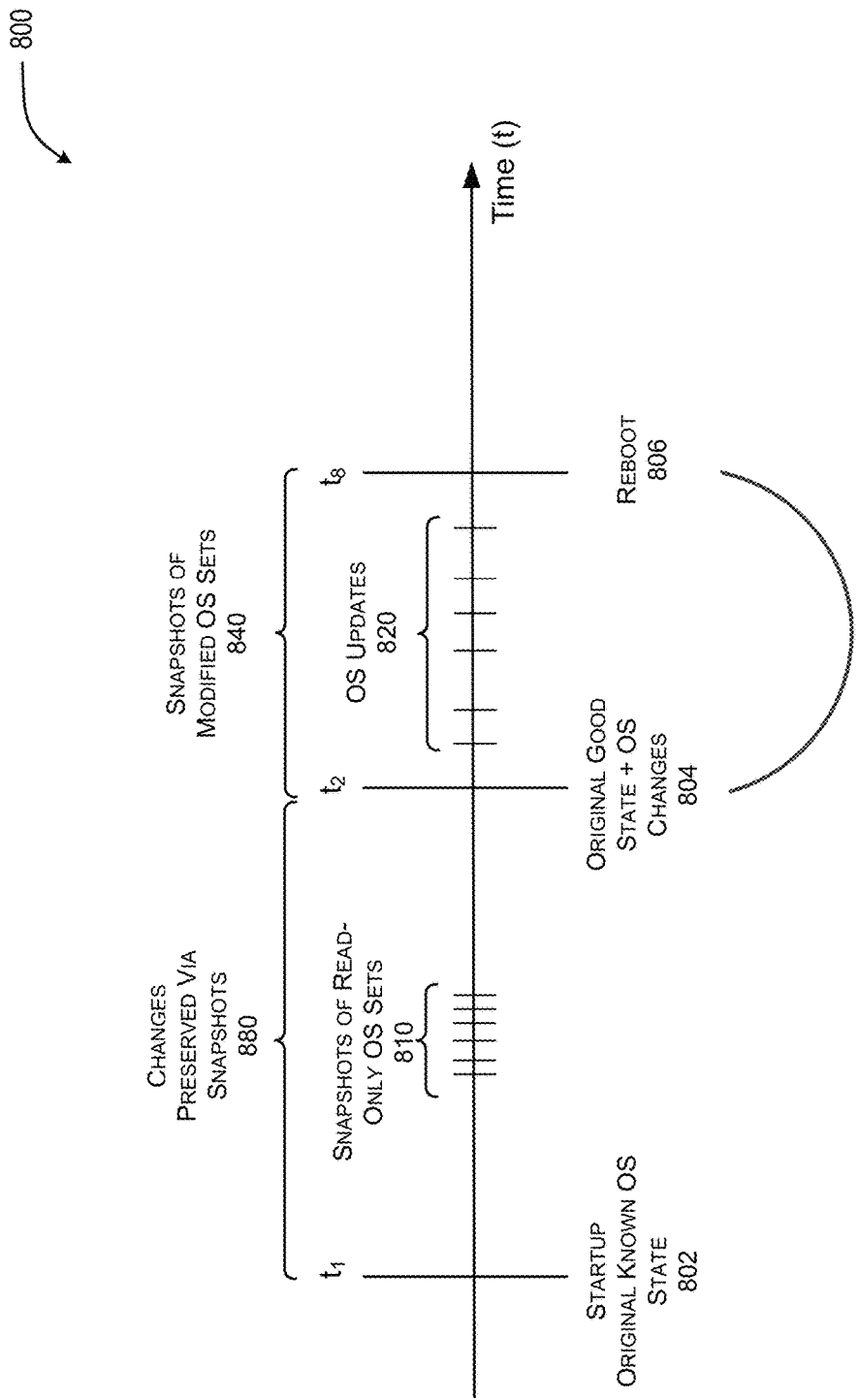
FIG. 8 is a diagram illustrating snapshots in accordance with the present disclosure.

Turning to FIG. 8, illustrated is an example implementation of snapshots in accordance with the present disclosure. FIG. 8 depicts a timing diagram 800 illustrating start-up 802 of a device at time t1, where the device is initially booted using the known operating system state. Until time t2 when the updated operating system is received, snapshots of the current operating system set may be captured. The changes are depicted as snapshot sets 810.

After time t2, operating system updates 820 are added to the current operating system in preparation for reboot 806. The snapshots 810 are persisted and can be made available for future reboots if needed.

Figure 9:
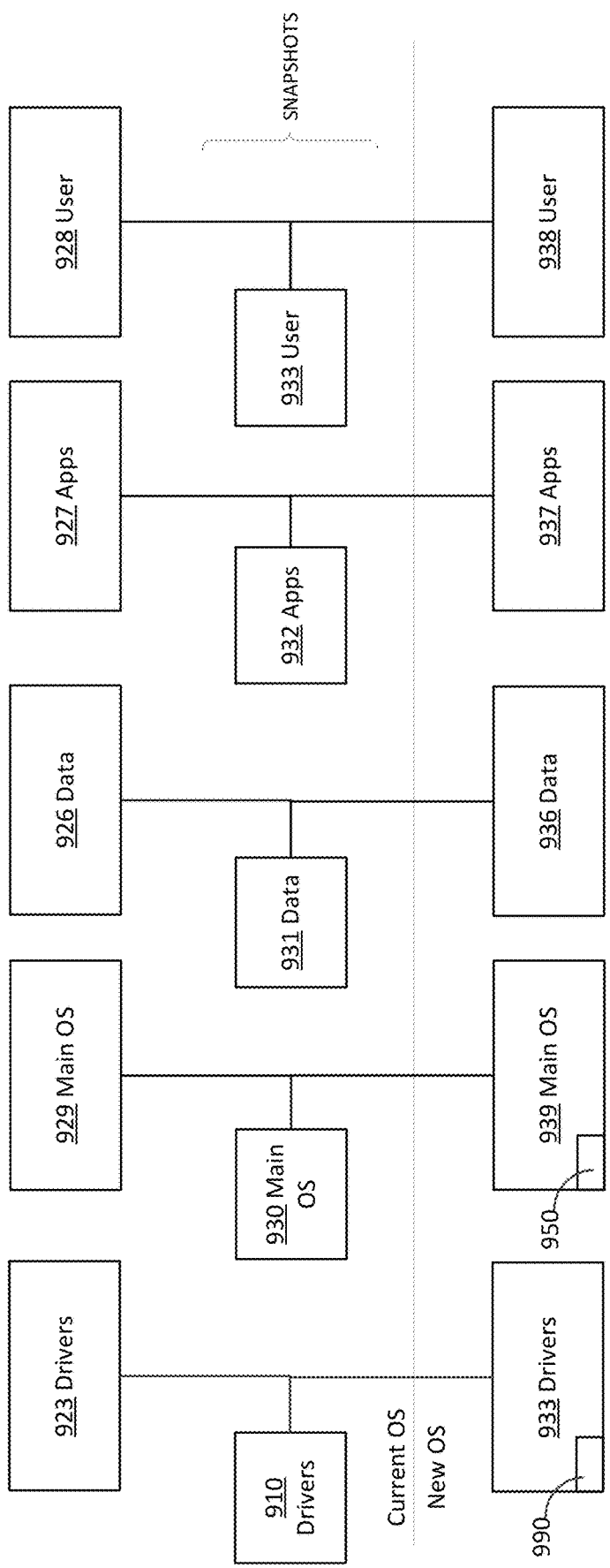
FIG. 9 is a diagram illustrating snapshots in accordance with the present disclosure.

Referring to FIG. 9, illustrated is an example implementation of snapshots in accordance with the present disclosure. FIG. 9 depicts an operating system set comprising drivers 923, main OS 929, data 926, applications 927, and user set 928. When an operating system update is to be attempted, snapshots of the drivers 910, main OS 930, data 931, applications 932, and user set 933 may be taken of the operating system set comprising drivers 923, main OS 929, data 926, applications 927, and user set 928. After the snapshots are taken, the operating system updates may be loaded included drivers 933, main OS 939, data 936, applications 937, and user set 938. In some embodiments only the deltas may be saved such as changes 990 to drivers 933 and changes 950 to main OS 939. The sets show in FIG. 9 are examples, and other sets may be defined for a given operating system.

Figure 10:
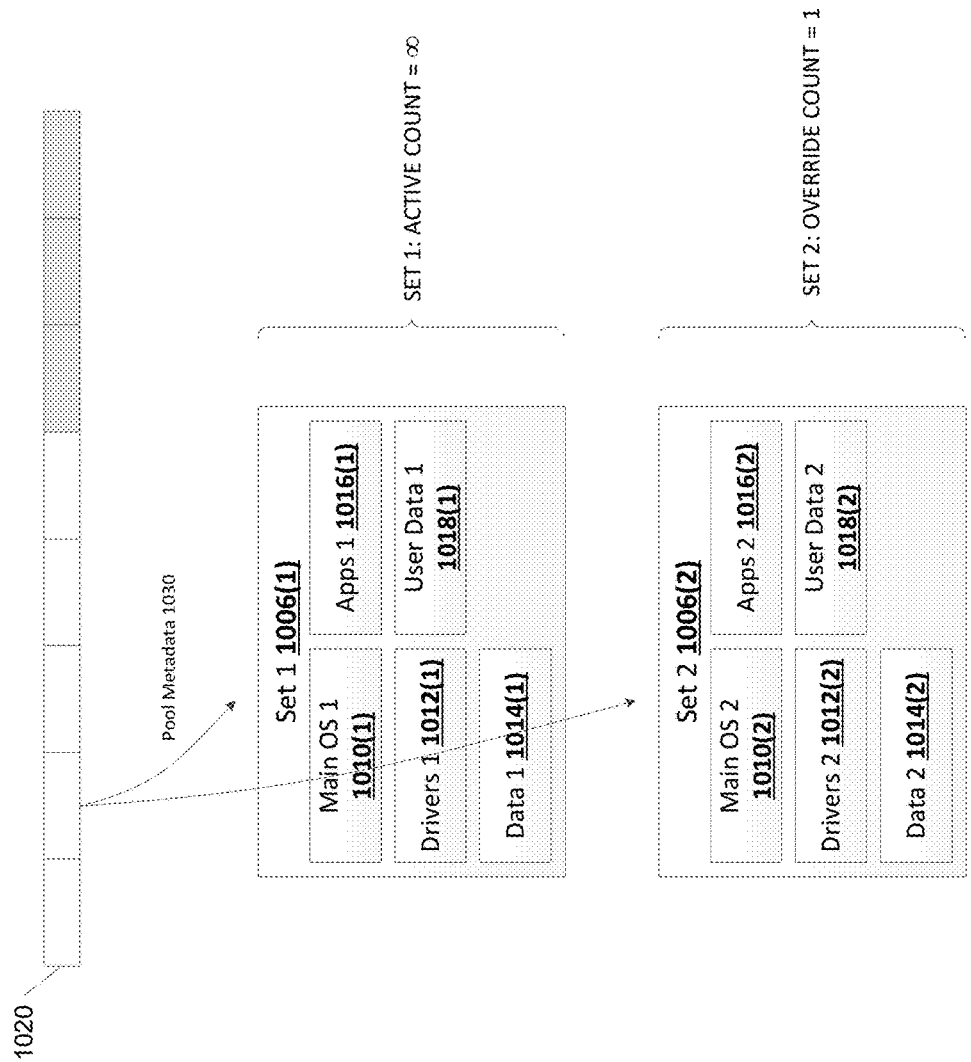
FIG. 10 is a diagram illustrating snapshots in accordance with the present disclosure.

Referring to FIG. 10, illustrated is an example implementation of snapshots in accordance with the present disclosure. FIG. 10 depicts a storage volume 1020 that includes metadata 1030 for a storage pool for the operating system versions. The metadata 1030 may describe a first set 1006(1) that may define a current operating system comprising drivers set 1 1012(1), main OS set 1 1010(1), data set 1 1014(1), applications set 1 1016(1), and user data set 1 1018(1). Operating system set 1 1006(1) may be associated with an active count of infinity to indicate that there is no limit to the number of reboots that may be performed with this operating system version.

Metadata 1030 may further describe a second set 1006(2) that may define an updated operating system comprising drivers set 2 1012(2), main OS set 2 1010(2), data set 2 1014(2), applications set 2 1016(2), and user data set 2 1018(2). Operating system set 2 1006(2) may be associated with an override count of one to indicate that the number of reboots that may be performed with this operating system version is limited to one.

Figure 11:
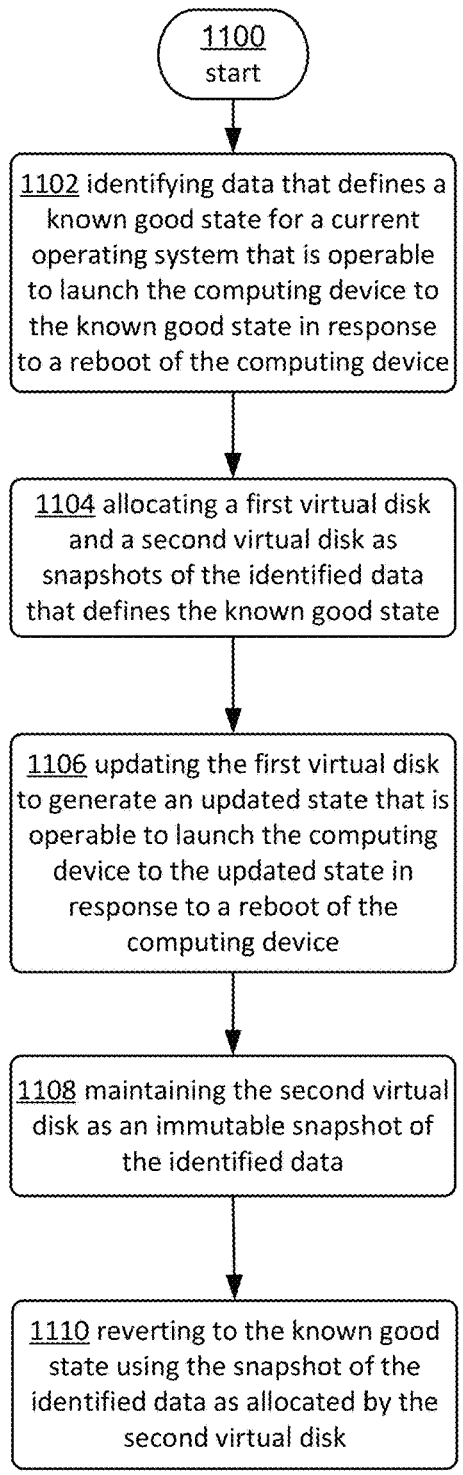
FIG. 11 is a flowchart depicting an example procedure for implementing techniques in accordance with the present disclosure.

Referring to FIG. 11, illustrated is an example operational procedure in accordance with the present disclosure. Referring to FIG. 11, Operation 1100 begins the procedure, and operation 1102 illustrates identifying data that defines a known good state for a current operating system that is operable to launch the computing device to the known good state in response to a reboot of the computing device. In an embodiment, the identified data includes read-only sets that are not updated during operation of the computing device, and modifiable sets that can be updated during operation of the computing device. Additionally and optionally, the read-only sets are captured on an opportunistic basis and the modifiable sets are captured when the computing device is to be rebooted.

Operation 1102 may be followed by Operation 1104. Operation 1104 illustrates allocating a first virtual disk and a second virtual disk as snapshots of the identified data that defines the known good state. Operation 1104 may be followed by Operation 1106. Operation 1106 illustrates updating the first virtual disk to generate an updated state that is operable to launch the computing device to the updated state in response to a reboot of the computing device. In an embodiment, updates to the first virtual disk are isolated from the second virtual disk. Operation 1106 may be followed by Operation 1108. Operation 1108 illustrates maintaining the second virtual disk as an immutable snapshot of the identified data. Operation 1108 may be followed by Operation 1110. Operation 1110 illustrates in response to a failed reboot of the computing device with the updated state, reverting to the known good state using the snapshot of the identified data as allocated by the second virtual disk.

Figure 12:
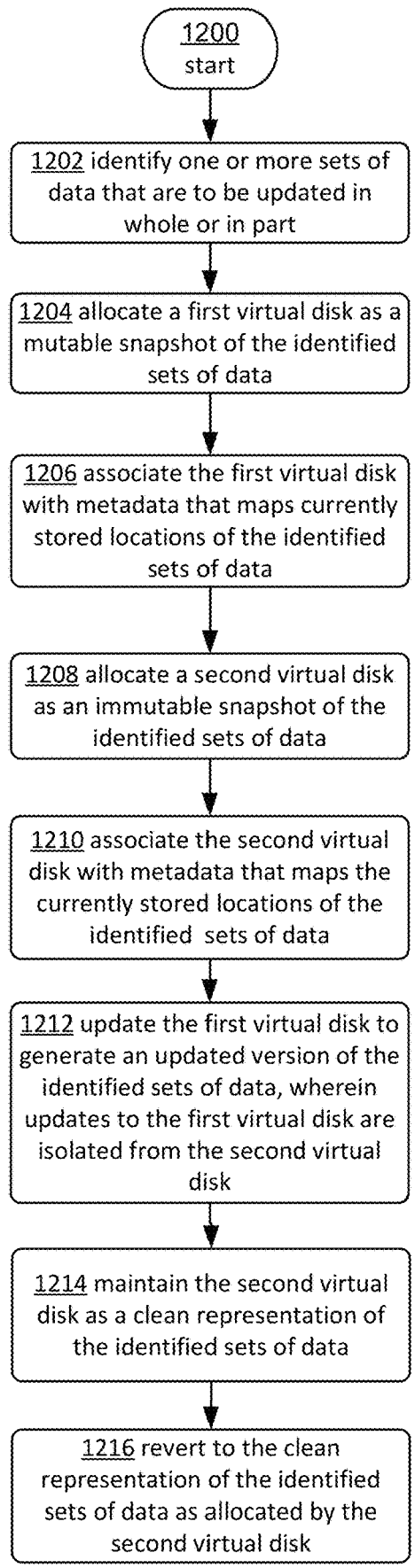
FIG. 12 is a flowchart depicting an example procedure for implementing techniques in accordance with the present disclosure.

Referring to FIG. 12, illustrated is an example operational procedure in accordance with the present disclosure. Referring to FIG. 12, Operation 1200 begins the procedure, and operation 1202 illustrates identifying one or more sets of data that are to be updated in whole or in part.

Operation 1202 may be followed by Operation 1204. Operation 1204 illustrates allocating a first virtual disk as a mutable snapshot of the identified sets of data. Operation 1204 may be followed by Operation 1206. Operation 1206 illustrates associating the first virtual disk with metadata that maps currently stored locations of the identified sets of data. Operation 1206 may be followed by Operation 1208. Operation 1208 illustrates allocating a second virtual disk as an immutable snapshot of the identified sets of data. Operation 1208 may be followed by Operation 1210. Operation 1210 illustrates associating the second virtual disk with metadata that maps the currently stored locations of the identified sets of data.

Operation 1210 may be followed by operation 1212. Operation 1212 illustrates updating the first virtual disk to generate an updated version of the identified sets of data, wherein updates to the first virtual disk are isolated from the second virtual disk.

Operation 1212 may be followed by operation 1214. Operation 1214 illustrates maintaining the second virtual disk as a clean representation of the identified sets of data.

Operation 1214 may be followed by operation 1216. Operation 1216 illustrates reverting to the clean representation of the identified sets of data as allocated by the second virtual disk.

Figure 13:
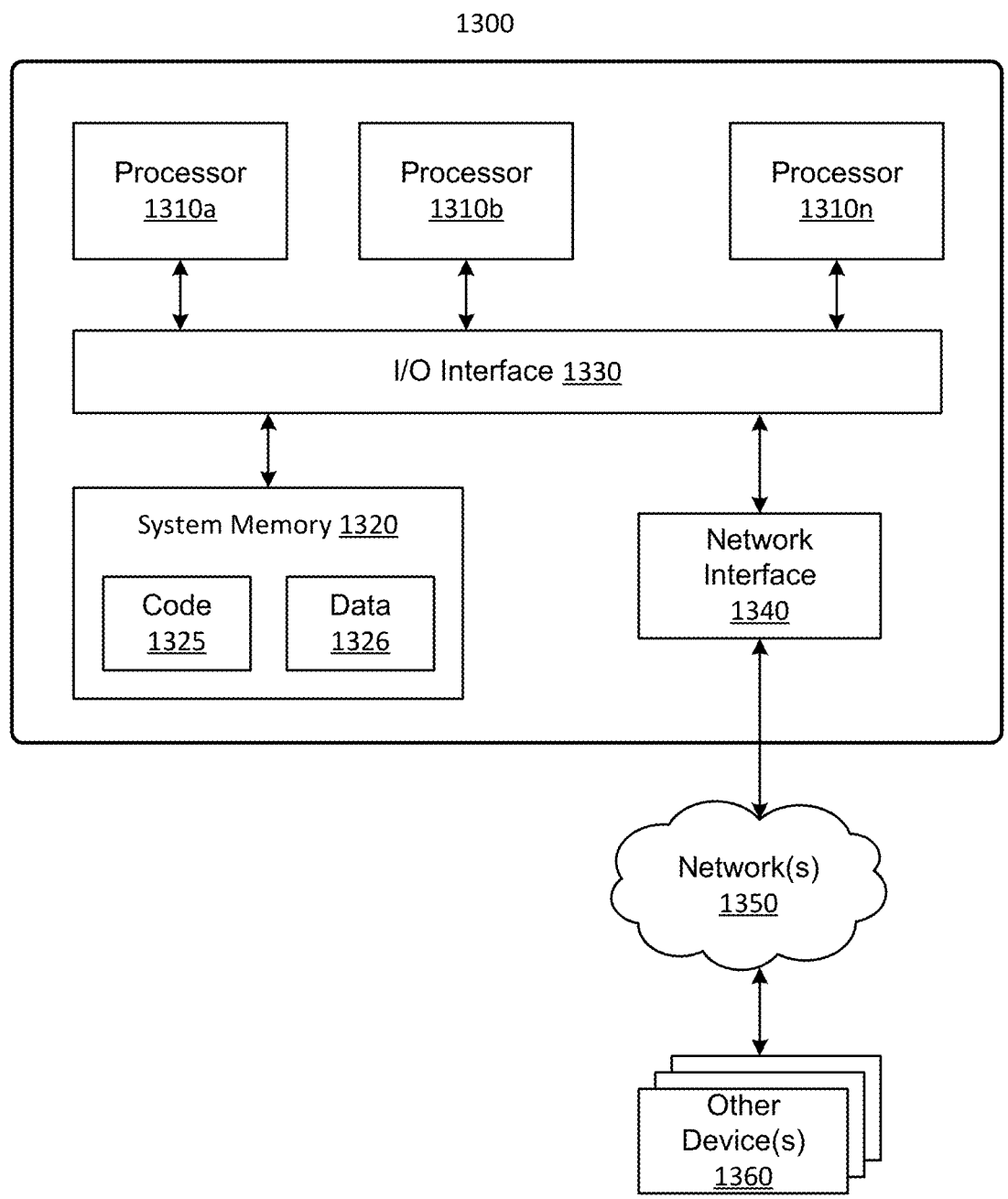
FIG. 13 is an example computing device in accordance with the present disclosure.

In at least some embodiments, a computing device that implements a portion or all of one or more of the technologies described herein, including the techniques to implement the functionality of a device may include a general-purpose computer system that includes or is configured to access one or more computer-accessible media. FIG. 13 illustrates such a general-purpose computing device 1300. In the illustrated embodiment, computing device 1300 includes one or more processors 1310a, 1310b, and/or 1310n (which may be referred herein singularly as "a processor 1310" or in the plural as "the processors 1310") coupled to a system memory 1320 via an input/output (I/O) interface 1330. Computing device 1300 further includes a network interface 1340 coupled to I/O interface 1330.

In various embodiments, computing device 1300 may be a uniprocessor system including one processor 1310 or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x136, PowerPC, SPARC, or MIPS ISAs, or any other suitable ISA. In multiprocessor systems, each of processors 1310 may commonly, but not necessarily, implement the same ISA.

System memory 1320 may be configured to store instructions and data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 1320 as code 1325 and data 1326.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing, or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computing device 1300 and other device or devices 1360 attached to a network or network(s) 1350, such as other computer systems or devices as illustrated in FIGS. 1 through 12, for example. In various embodiments, network interface 1340 may support communication via any suitable wired or wireless general data networks, such as types of Ethernet networks, for example. Additionally, network interface 1340 may support communication via telecommunications/telephony networks such as analog voice networks or digital fiber communications networks, via storage area networks such as Fibre Channel SANs or via any other suitable type of network and/or protocol.

In some embodiments, system memory 1320 may be one embodiment of a computer-accessible medium configured to store program instructions and data as described above for FIGS. 1-12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 1300 via I/O interface 1330. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1300 as system memory 1320 or another type of memory. Further, a computer-accessible medium may include transmission media or signals such as electrical, electromagnetic or digital signals, conveyed via a communication medium such as a network and/or a wireless link, such as may be implemented via network interface 1340. Portions or all of multiple computing devices, such as those illustrated in FIG. 13, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

EXAMPLE CLAUSES

The disclosure presented herein encompasses the subject matter set forth in the following example clauses.

Example Clause A, a computer-implemented method for updating an operating system of a computing device, the method comprising:
identifying data that defines a known good state for a current operating system that is operable to launch the computing device to the known good state in response to a reboot of the computing device, wherein:
the identified data includes read-only sets that are not updated during operation of the computing device, and modifiable sets that can be updated during operation of the computing device, and
the read-only sets are captured on an opportunistic basis and the modifiable sets are captured when the computing device is to be rebooted;
allocating a first virtual disk and a second virtual disk as snapshots of the identified data that defines the known good state;
updating the first virtual disk to generate an updated state that is operable to launch the computing device to the updated state in response to a reboot of the computing device, wherein updates to the first virtual disk are isolated from the second virtual disk;
maintaining the second virtual disk as an immutable snapshot of the identified data; and
in response to a failed reboot of the computing device with the updated state, reverting to the known good state using the snapshot of the identified data as allocated by the second virtual disk.

Example Clause B, the computer-implemented method of Example Clause A, further comprising allocating additional virtual disks as representations of the identified data that defines the known good state.

Example Clause C, the computer-implemented method of any one of Example Clauses A through B, further comprising discarding the first virtual disk.

Example Clause D, the computer-implemented method of any one of Example Clauses A through C, wherein the first and second virtual disks are mapped to physical locations where the identified data is stored.

Example Clause E, the computer-implemented method of any one of Example Clauses A through D, wherein updating the first virtual disk comprises reading data from physical locations where updated portions of the identified data are stored, updating the read data, writing the updated data to new physical locations, and updating metadata for the first virtual disk to map to the new physical locations.

Example Clause F, the computer-implemented method of any one of Example Clauses A through E, wherein the operating system is implemented as sets of partitions that are separately updatable.

Example Clause G, the computer-implemented method of any one of Example Clauses A through F, wherein the updated sets comprise delta changes to the current operating system.

Example Clause H, the computer-implemented method of any one of Example Clauses A through G, further comprising storing multiple operating system updates that each define a known operating system state, wherein only one operating system state is allowed to be used for reboot.

While Example Clauses A through H are described above with respect to a computer-implemented method, it is understood in the context of this disclosure that the subject matter of Example Clauses A through H can additionally or alternatively be implemented by a system or device or computer readable medium.

Example Clause I, a computing device comprising:
one or more processors;
a memory in communication with the one or more processors, the memory having computer-readable instructions stored thereupon which, when executed by the one or more processors, cause the computing device to:
identify one or more sets of data that are to be updated in whole or in part;
allocate a first virtual disk as a mutable snapshot of the identified sets of data;
associate the first virtual disk with metadata that maps currently stored locations of the identified sets of data;
allocate a second virtual disk as an immutable snapshot of the identified sets of data;
associate the second virtual disk with metadata that maps the currently stored locations of the identified sets of data;
update the first virtual disk to generate an updated version of the identified sets of data, wherein updates to the first virtual disk are isolated from the second virtual disk;
maintain the second virtual disk as a clean representation of the identified sets of data; and
revert to the clean representation of the identified sets of data as allocated by the second virtual disk.

Example Clause J, the system of Example Clause I, further comprising computer-readable instructions stored thereupon which, when executed by the one or more processors, cause the computing device to:
allocate a third virtual disk as a mutable snapshot of the identified sets of data; associate the third virtual disk with metadata that maps the currently stored locations of the identified sets of data;
update the third virtual disk to generate an updated version of the identified sets of data, wherein updates to the third virtual disk are isolated from the first and second virtual disks; and maintain the second virtual disk as a clean copy of the identified sets of data.

Example Clause K, the system of any one of Example Clauses H through J, further comprising computer-readable instructions stored thereupon which, when executed by the one or more processors, cause the computing device to:
allocate a third virtual disk as an immutable snapshot of the first virtual disk;
associate the third virtual disk with metadata that maps currently stored locations of data mapped to the first virtual disk;
allocate a fourth virtual disk as a mutable snapshot of the first virtual disk; associate the fourth virtual disk with metadata that maps currently stored locations of data mapped to the first virtual disk;
update the fourth virtual disk to generate an updated version of the data mapped to the fourth virtual disk, wherein updates to the fourth virtual disk are isolated from the first, second, and third virtual disks;
maintain the second virtual disk as a clean copy of the identified sets of data; and maintain the third virtual disk as a snapshot of the first virtual disk.

Example Clause L, the system of any one of Example Clauses H through K, further comprising computer-readable instructions stored thereupon which, when executed by the one or more processors, cause the computing device to:
allocate additional virtual disks as snapshots of defined subsets of data.

Example Clause M, the system of any one of Example Clauses H through L, wherein the identified one or more sets of data are partitions of a current operating system.

Example Clause N, the system of any one of Example Clauses H through M, further comprising computer-readable instructions stored thereupon which, when executed by the one or more processors, cause the computing device to:
discard the first virtual disk and updates associated with the first virtual disk.

Example Clause O, the system of any one of Example Clauses H through N, further comprising computer-readable instructions stored thereupon which, when executed by the one or more processors, cause the computing device to:
revert to the second virtual disk as a clean copy of the identified sets of data.

While Example Clauses H through O are described above with respect to a system, it is understood in the context of this disclosure that the subject matter of Example Clauses H through O can additionally or alternatively be implemented by a device3 or method or computer readable medium.

Example Clause P, a computer-readable medium having encoded thereon computer-executable instructions that, when executed, cause one or more processing units of a computing device to execute a method comprising:
identifying data that is to be updated in whole or in part;
allocating a first virtual disk as a mutable snapshot of the identified data;
associating the first virtual disk with metadata that maps currently stored locations of the identified data on a physical storage space;
allocating a second virtual disk as an immutable snapshot of the identified data; associating the second virtual disk with metadata that maps the currently stored locations of the identified data on the physical storage space;
updating the first virtual disk to generate an updated version of the identified data, wherein updates to the first virtual disk are isolated from the second virtual disk and wherein updates to the first virtual disk are written to the physical storage space; and updating the metadata associated with the first virtual disk to map the updates to the first virtual disk.

Example Clause Q, the computer-readable medium of any one of Example Clause P, further comprising computer-executable instructions that, when executed, cause one or more processing units of a computing device to execute a method comprising:
allocating additional virtual disks as additional snapshots are needed.

Example Clause R, the computer-readable medium of any one of Example Clauses Q through P, wherein updating the first virtual disk comprises reading data from physical locations where updated portions of the identified data are stored, updating the read data, writing the updated data to new physical locations, and updating metadata for the first virtual disk to map to the new physical locations.

Example Clause S, the computer-readable medium of any one of Example Clauses Q through R, wherein updating the first virtual disk comprises reading physical locations on an on-demand basis.

Example Clause T, the computer-readable medium of any one of Example Clauses Q through S, wherein updating the first virtual disk comprises tracking updates in a journal prior to committing the updates to permanent storage.

While Example Clauses Q through T are described above with respect to a computer-readable medium, it is understood in the context of this disclosure that the subject matter of Example Clauses Q through T can additionally or alternatively be implemented by a method or via a device or via a system.

What is claimed is:

1. A computer-implemented method for updating an operating system of a computing device, the method comprising:
    identifying data that defines a known good state for a current operating system and that is operable to launch the computing device to the known good state in response to a reboot of the computing device, wherein:
    the data includes read-only sets that are not updated during operation of the computing device, and modifiable sets that are configured to be updated during operation of the computing device, and
    the read-only sets are captured on an opportunistic basis and the modifiable sets are captured in response to a reboot of the computing device;
    allocating a first virtual disk and a second virtual disk as a first snapshot and second snapshot, respectively, of the data that defines the known good state;
    updating the first virtual disk to generate an updated state that is operable to launch the computing device to the updated state in response to a reboot of the computing device, wherein updates to the first virtual disk are isolated from the second virtual disk;
    maintaining the second virtual disk as an immutable snapshot of the data;
    generating a third snapshot of the updated state by allocating a third virtual disk based on the updated state;
    maintaining the updated first virtual disk as an additional immutable snapshot; and
    in response to a failed reboot of the computing device with the updated state represented by the third virtual disk, reverting the computing device to the known good state using the snapshot of the data as allocated by the second virtual disk or reverted to the updated state as allocated by the updated first virtual disk as the additional immutable snapshot;
    wherein the first, second, and third virtual disks are virtual disk nodes of a tree structure where the first, second, and third virtual disks are configured to be forked to create additional virtual disk nodes, wherein the first and second virtual disk nodes are immutable snapshots and subsequent leaf nodes including the third virtual disk are mutable until the subsequent leaf nodes and third virtual disk are allocated as snapshots; and
    causing a reboot of the computing device, wherein during the reboot of the computing device, each snapshot is associated with a count, and wherein a count value greater than zero indicates which snapshot has priority for the reboot.

2. The computer-implemented method of claim 1, further comprising allocating additional virtual disks as representations of the data that defines the known good state.

3. The computer-implemented method of claim 1, further comprising discarding the first virtual disk.

4. The computer-implemented method of claim 1, wherein the first and second virtual disks are mapped to physical locations where the data is stored.

5. The computer-implemented method of claim 1, wherein updating the first virtual disk comprises reading data from physical locations where updated portions of the identified data are stored, updating the read data, writing the updated data to new physical locations, and updating metadata for the first virtual disk to map to the new physical locations.

6. The computer-implemented method of claim 1, wherein the operating system is implemented as sets of partitions that are separately updatable.

7. The computer-implemented method of claim 6, wherein the sets of partitions comprise delta changes to the current operating system.

8. The computer-implemented method of claim 1, further comprising storing multiple operating system updates that each define a known operating system state, wherein only one operating system state is allowed to be used for reboot.

9. A computing device comprising:
    one or more processors;
    a memory in communication with the one or more processors, the memory having computer-readable instructions stored thereupon which, when executed by the one or more processors, cause the computing device to:
    identify one or more sets of data that are to be updated in whole or in part;
    allocate a first virtual disk as a mutable snapshot of the sets of data;
    associate the first virtual disk with metadata that maps currently stored locations of the sets of data;
    allocate a second virtual disk as an immutable snapshot of the sets of data;
    associate the second virtual disk with metadata that maps the currently stored locations of the sets of data;
    update the first virtual disk to generate an updated version of the sets of data, wherein updates to the first virtual disk are isolated from the second virtual disk;
    maintain the second virtual disk as a clean representation of the sets of data;
    allocate a third virtual disk with metadata that maps stored locations of the updated version of the sets of data;
    maintain the first virtual disk as an immutable snapshot of the updated version of the sets of data;
    revert to the clean representation of the sets of data as allocated by the second virtual disk or to the immutable snapshot of the updated version of the sets of data as maintained by the first virtual disk;
    wherein the first, second, and third virtual disks are virtual disk nodes of a tree structure where the first, second, and third virtual disks are configured to be forked to create additional virtual disk nodes, wherein the first and second virtual disk nodes are immutable snapshots and subsequent leaf nodes including the third virtual disk are mutable until the subsequent leaf nodes and third virtual disk are allocated as snapshots; and
    causing a reboot of the computing device, wherein during the reboot of the computing device, each snapshot is associated with a count, and wherein a count value greater than zero indicates which snapshot has priority for the reboot.

10. The computing device of claim 9, further comprising computer-readable instructions stored thereupon which, when executed by the one or more processors, cause the computing device to:
    allocate a fourth virtual disk as a mutable snapshot of the first virtual disk;
    associate the fourth virtual disk with metadata that maps currently stored locations of data mapped to the first virtual disk;
    update the fourth virtual disk to generate an updated version of the data mapped to the fourth virtual disk, wherein updates to the fourth virtual disk are isolated from the first, second, and third virtual disks;

maintain the second virtual disk as a clean copy of the identified sets of data; and maintain the third virtual disk as a snapshot of the first virtual disk.

11. The computing device of claim 9, further comprising computer-readable instructions stored thereupon which, when executed by the one or more processors, cause the computing device to:

allocate additional virtual disks as snapshots of defined subsets of data.

12. The computing device of claim 9, wherein the one or more sets of data are partitions of a current operating system.

13. The computing device of claim 9, further comprising computer-readable instructions stored thereupon which, when executed by the one or more processors, cause the computing device to:

discard the first virtual disk and updates associated with the first virtual disk.

14. The computing device of claim 13, further comprising computer-readable instructions stored thereupon which, when executed by the one or more processors, cause the computing device to:

revert to the second virtual disk as a clean copy of the identified sets of data.

15. A non-transitory computer-readable medium having encoded thereon computer-executable instructions that, when executed, cause one or more processing units of a computing device to execute a method comprising:

identifying data that is to be updated in whole or in part;

allocating a first virtual disk as a mutable snapshot of the data;

associating the first virtual disk with metadata that maps currently stored locations of the data on a physical storage space;

allocating a second virtual disk as an immutable snapshot of the data;

associating the second virtual disk with metadata that maps the currently stored locations of the data on the physical storage space;

updating the first virtual disk to generate an updated version of the data, wherein updates to the first virtual disk are isolated from the second virtual disk and wherein updates to the first virtual disk are written to the physical storage space;

allocating a third virtual disk with metadata that maps stored locations of the updated version of the data;

maintain the first virtual disk as an immutable snapshot of the updated version of the data;

updating metadata associated with the third virtual disk to map updates to the third virtual disk;

wherein the first, second, and third virtual disks are virtual disk nodes of a tree structure where the first, second, and third virtual disks are configured to be forked to create additional virtual disk nodes, wherein the first and second virtual disk nodes are immutable snapshots and subsequent leaf nodes including the third virtual disk are mutable until the subsequent leaf nodes and third virtual disk are allocated as snapshots; and causing a reboot of the computing device, wherein during the reboot of the computing device, each snapshot is associated with a count, and wherein a count value greater than zero indicates which snapshot has priority for the reboot.

16. The non-transitory computer-readable medium of claim 15, further comprising computer-executable instructions that, when executed, cause one or more processing units of a computing device to execute a method comprising:

allocating additional virtual disks as additional snapshots are needed.

17. The non-transitory computer-readable medium of claim 15, wherein updating the first virtual disk comprises reading data from physical locations where updated portions of the data are stored, updating the read data, writing the updated data to new physical locations, and updating metadata for the first virtual disk to map to the new physical locations.

18. The non-transitory computer-readable medium of claim 15, wherein updating the first virtual disk comprises reading physical locations on an on-demand basis.

19. The non-transitory computer-readable medium of claim 15, wherein updating the first virtual disk comprises tracking updates in a journal prior to committing the updates to permanent storage.

* * * * *